Nov. 28, 1961   W. P. GODLEY   3,011,098
METER
Filed Aug. 30, 1957   3 Sheets-Sheet 1
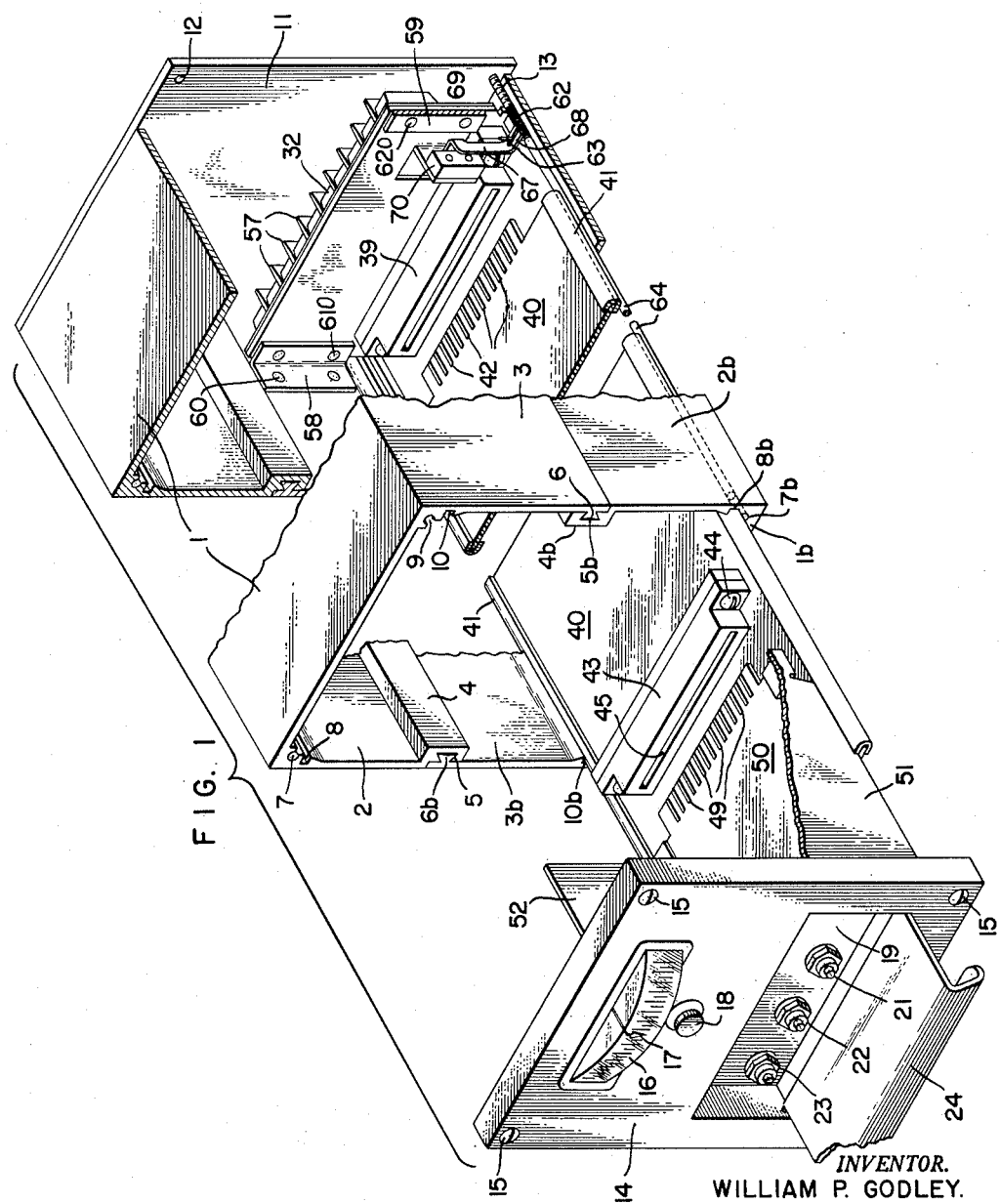
INVENTOR.
WILLIAM P. GODLEY.
BY Arthur H. Swanson
ATTORNEY.

Nov. 28, 1961 W. P. GODLEY 3,011,098
METER
Filed Aug. 30, 1957 3 Sheets-Sheet 2
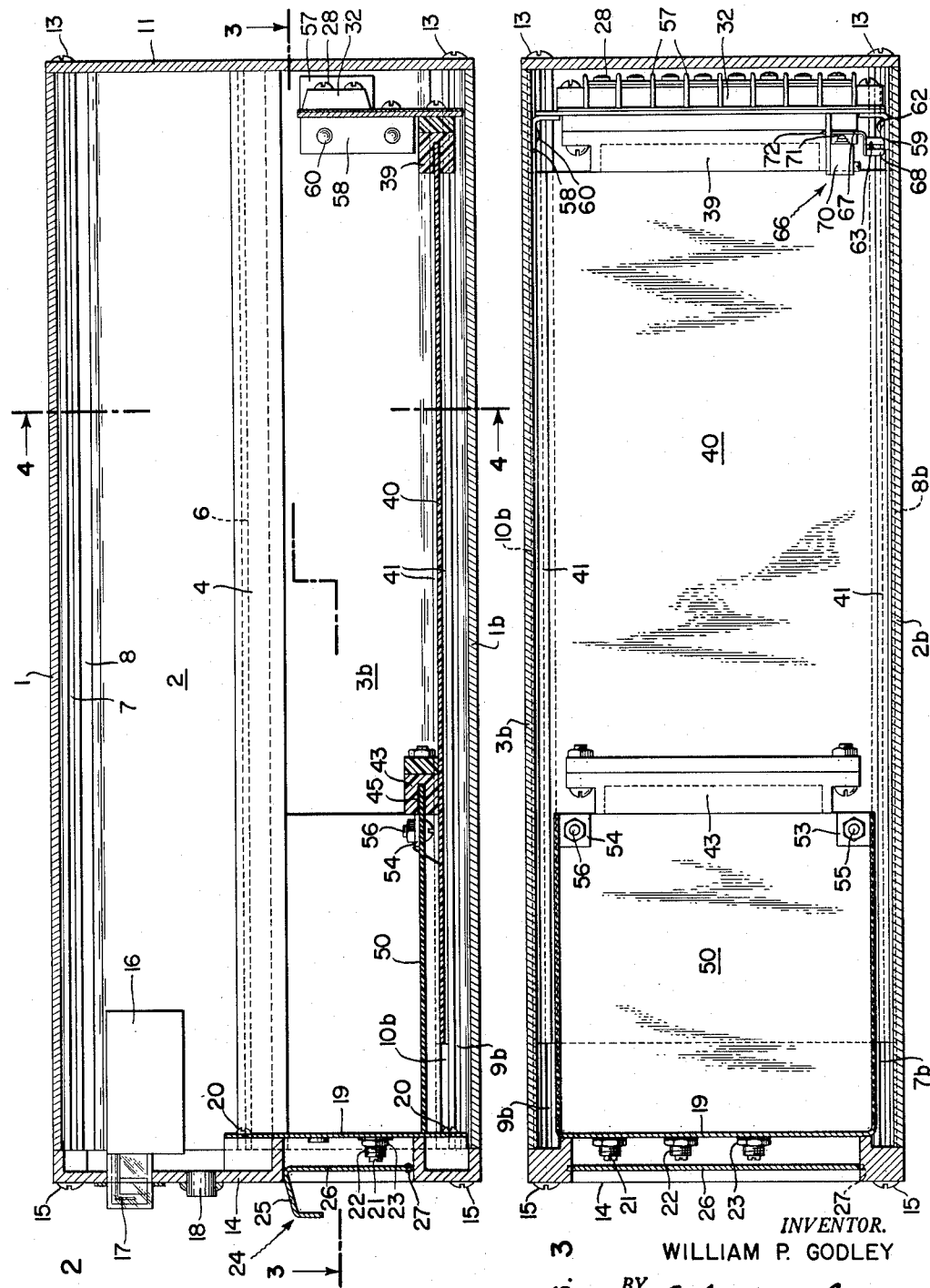
INVENTOR.
WILLIAM P. GODLEY
BY
Arthur H. Swanson
ATTORNEY.

Nov. 28, 1961 W. P. GODLEY 3,011,098
METER
Filed Aug. 30, 1957 3 Sheets-Sheet 3

INVENTOR.
WILLIAM P. GODLEY
BY Arthur H. Swanson
ATTORNEY.

United States Patent Office 3,011,098
Patented Nov. 28, 1961

3,011,098
METER
William P. Godley, Hatboro, Pa., assignor to Minneapolis-Honeywell Regulator Company, Minneapolis, Minn., a corporation of Delaware
Filed Aug. 30, 1957, Ser. No. 681,228
10 Claims. (Cl. 317—107)

An object of the invention is to provide a combined instrument case and chassis which may be manufactured by mass production methods rapidly and economically.

It is a specific object of this invention to combine into a single unit, in place of the separate case and chassis heretofore employed, the case and the chassis, on which chassis are mounted instrument components such as the input terminals, the amplifying circuit, the measuring circuit, and the meter.

This invention has particular utility in connection with instruments which measure and indicate electric current of the order of a few milliamperes. Such instruments may be used to measure electricity directly but are usually used to measure electric currents which are produced from some other measured variable, such as pressure, temperature, or the like, by means of a transducer. Such instruments comprise: input terminals, an amplifying circuit; a measuring circuit; and a meter which indicates the milliamperes.

It is yet a further object of this invention to provide a combined case and chassis in which the various parts may be assembled in different combinations so as to provide instruments capable of use with different inputs or with different outputs or with different amplifying circuits combined with different measuring circuits.

A better understanding of the present invention may be had from the following detailed description when read in connection with the accompanying drawings, in which:

FIG. 1 is a cut-away, perspective view;

FIG. 2 is a vertical, longitudinal, cross section.

FIG. 3 is a horizontal, longitudinal, cross section on line 3—3 of FIG. 2 viewed in the direction of the arrows.

The combined case and chassis of my invention is composed of a substantially U-shaped channel which is made, as by extrusion, from a suitable material, such as metal, namely, aluminum.

Figure 4:
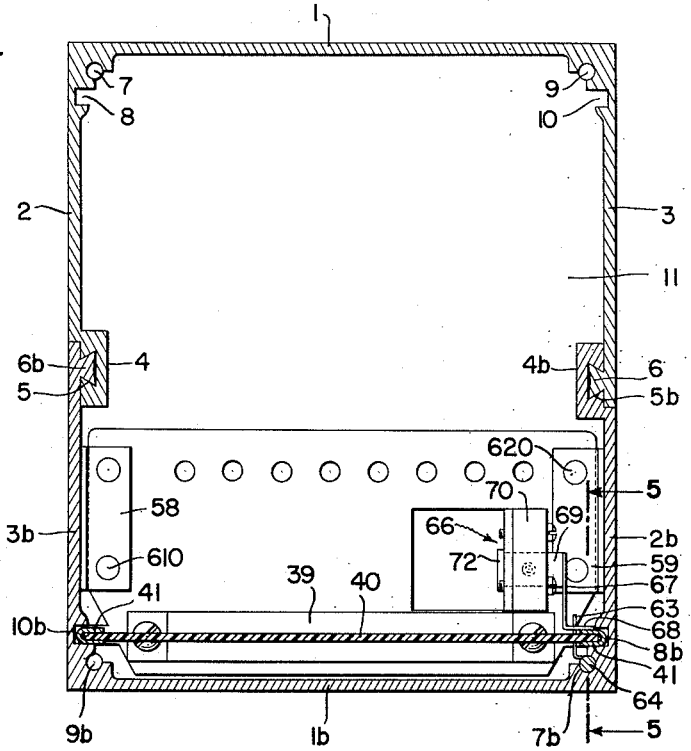
FIG. 4 is a vertical transverse, cross section on line 4—4 of FIG. 2; viewed in the direction of the arrows.

As seen in FIGS. 1 and 4, the U-shaped channel which forms one half of the combined case and chassis comprises a top wall 1, a left-hand side wall 2, and a right-hand side wall 3. The lower end of the left-hand side wall 2 is formed of a block or rail 4 having a groove 5 extending longitudinally thereof. Near the lower end of the right-hand side wall 3 is a tongue 6 extending longitudinally of the right-hand side wall 3 and of a suitable size and shape to interfit slidably with the groove 5b.

On the inner side of the U-shaped section at the junction between top wall 1 and left-hand side wall 2 is a screw-receiving opening 7 which is substantially circular in transverse cross section. Adjacent opening 7 is a board-receiving opening 8 which is substantially rectangular in transverse cross section. Betwen top wall 1 and right-hand side wall 3 is a screw-receiving opening 9 which is substantially circular in transverse cross section. Also on the inner side of the U-shaped channel and in right-hand side wall 3 is a board-receiving opening 10 which is also substantially rectangular in transverse cross section.

The bottom half of the combined case and chassis is formed of another portion of the U-shaped, extruded channel and comprises a bottom wall 1b, a right-hand side wall 2b having a block 4b provided with a longitudinally extending groove 5b in it, and a left-hand side wall 3b having a longitudinally extending tongue 6b adjacent the upper end thereof.

The two U-shaped channels interfit to form two halves of the combined case and chassis. The rear wall of the combined case and chassis is a flat plate 11 having holes 12 (FIG. 1) passing through it adjacent the corners thereof. Through holes 12 extend screws 13 which are received in the end of the screw-receiving holes 7, 9, 7b and 9b. Screws 13 hold the rear plate 11 onto the combined case and chassis.

The front of the combined case and chassis is a substantially flat plate 14 having holes passing through it adjacent the corners thereof. Screws 15 extend through these holes and into the ends of the screw-receiving holes 7, 9, 7b, and 9b, and thus hold the front plate 14 onto the combined case and chassis. An electric meter, such as a milliammeter 16, is mounted on and supported by said front plate 14. Meter 16 has a portion which projects through the front plate 14 and which includes a pointer 17 visible from the front of the combined case and chassis. Also visible from the front of the combined case and chassis is a pilot light 18.

FIG. 2 shows that screws 20 secure a substantially flat plate 19 to the rear face of the front plate 14. Adjusting screws 21 are mounted on plate 19 by tubes 22 and nuts 23. Screws 21 serve to mechanically adjust various electric and electronic components of the measuring circuit.

A combined handle and cover 24 has two positions. In the vertical position (shown in FIG. 2) the combined cover and handle covers the adjusting screws 21. In the horizontal position (shown in FIG. 1) the combined handle and cover permit access to the adjusting screws 21. The combined cover and handle comprises a flat portion 26 and a substantially U-shaped portion 25 into which the fingers of the user may be inserted so that U-shaped portion 25 provides a handle to pull the combined cover and handle 24 downward about its pivot 27 and to pull the combined case and chassis longitudinally along its support.

Electricity is conducted to the amplifying circuit by means of input terminals 28. These input terminals 28 are screws mounted in a horizontal terminal block 32 of insulating material.

Terminal block 32 has a plurality of vertical baffles 57 on it which separte the input terminals 28 from one another. Terminal block 32 is mounted in the combined case and chassis by means of a pair of L-shaped angles 58 and 59. Angle 58 is fastened to side wall 3b by fastenings 60 and to terminal block 32 by fastenings 610. Angle 59 is connected to side wall 2b by fastenings (which are not shown in FIG. 1 because they are cut away). Angle 59 is connected to terminal block 32 by fastenings 620.

A block 39 of insulating material is supported on the angles 58 and 59.

A board 40 of insulating material supports the various conducting, electric and electronic components which form the amplifying circuit. These elements are not shown because the present invention is broad enough to cover many circuits combining many such components. The amplifying circuit, or parts thereof, as well as components thereof, may be formed by printed circuit techniques. The board 40 and the components of the amplifying circuit supported thereby are mounted in the combined case and chassis by means of a pair of clips 41 which engage the side edges of the board 40 and which are themselves engaged in the board-receiving slots 8b and 10b. Board 40 has at its rear end a plurality of contacts 42 adapted to engage with and disengage from horizontal contacts on blocks 39.

Also mounted on board 40 is a second terminal block 43 having a cavity 45 in it.

A second board 50 of insulating material is mounted on front plate 14 and is composed of a number of conductors and electric and electronic components which are connected together to form a measuring circuit and which are not shown because the present invention is broad enough to cover many circuits combining many such components. Various of these conductors and of parts of these circuits and of these components may be formed by printed circuit techniques. Board 50 is supported on front plate 14 by means of two vertical walls 51 and 52 connected to vertical wall 19 and having at their rear end tangs 53 and 54 through which pass bolts 55 and 56 by means of which board 50 is secured to plate 14. Board 50 has at its rear a plurality of contacts 49 which engage with and disengage from contacts located in terminal block 43.

Means are provided for cutting off the electricity of the meter when the combined case and chassis is opened. These means comprise an electric switch located in the conductors which carry the electricity to the meter from the source of electricity, such as a commercially available, alternating current, 60 cycle source of electricity. This switch is arranged so that it is thrown to open-circuit position when the combined case and chassis is opened.

This switch and its actuating means comprise a spring 61 which bears at its right hand end 62 on the left hand end of one of the screws 13. At its left hand end spring 61 bears on the right hand end 65 of an elongated rod 64 which contacts at its left hand end with the right hand end of one of the screws 15.

Spring 61 has a vertical, switch-actuating portion 63 which passes between two horizontal fingers 68 forming part of a switch-actuating member 67 which also has a substantially vertical, switch-actuating portion 69.

The switch itself is generally indicated at 66 and comprises a small electric switch such as those made under U.S. Patent 1,960,020 to McGall. Switch 66 has a case 70 and a small, switch-actuating shaft 71 extending therefrom into engagement with portion 69. Switch-actuating member 67 is pivoted in the combined case and chassis by means of pair of gears 72 attached to the end of switch-actuating portion 69 and spaced away from vertical, switch-actuating member 67.

Figure 5:
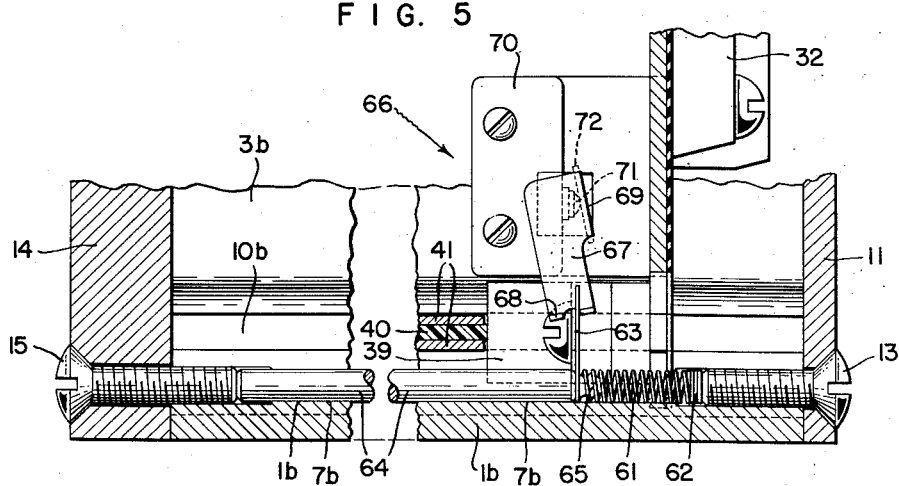
FIG. 5 is a partial, vertical, longitudinal, cross section on an enlarged scale on line 5—5 of FIG. 4 viewed in the direction of the arrows.

The operation of this switch is as follows: If screw 15 is removed so that plate 14 may be taken off the front of the combined case and chassis, spring 61 causes rod 64 to move to the left, as seen in FIG. 5. This leftward movement of vertically extending portion 63 causes switch-actuating member 67 to turn about its pivot on ears 72 and to move away from switch-actuating shaft 71. This movement of switch-actuating shaft 71 causes switch 66 to move to its open-circuit position.

What is claimed is:

1. In an instrument, a combined case and chassis, including, a pair of substantially U-shaped channels each having in the inner wall thereof adjacent the top of one leg of the U, a groove, and on the inner wall thereof adjacent the top of the other leg of the U, a tongue adapted to fit into the groove, said U-shaped channels being interfitted together to form the sides of the combined case and chassis, and means closing the ends of the channels to provide a combined case and chassis having a hollow interior completely enclosed by the combined case and chassis.

2. In an instrument, a combined case and chassis, including, a first U-shaped channel, a second U-shaped channel substantially identical with said first U-shaped channel, said U-shaped channels having, adjacent the upper ends of the legs of the U, means interfitting together to hold said channels in spaced relation to each other, flat plates closing the open ends of said channels to form a box-shaped combined case and chassis having a hollow in the interior thereof, a block of insulating material mounted on said combined case and chassis, input terminals mounted on said block, a board of insulating material mounted in openings in one of said channels in the interior of said combined case and chassis, and contacts on said board adapted for engagement with said input terminals.

3. An instrument including, a combined case and chassis having a pair of identical substantially U-shaped channels interfitting together at the open end of the U, means closing the open end of the channels to form a case which completely surrounds its hollow interior, fasteners connecting said means to said channels, and an electric switch mounted on said combined case and chassis and operated by said fasteners when said fasteners are detached to open said combined case and chassis.

4. An instrument including, a combined case and chassis, including, a pair of substantially U-shaped channels each having in the inner wall thereof adjacent the top of one leg of the U, a groove, and on the inner wall thereof adjacent the top of the other leg of the U, a tongue adapted to fit into the groove, said U-shaped channels being interfitted together to form the sides of the combined case and chassis, means closing the ends of said channels to provide a combined case and chassis having a hollow interior completely enclosed by the combined case and chassis, fasteners securing said means to the ends of said channel, and an electric switch mounted on the combined case and chassis and adapted to be actuated by one of said fasteners when said fastener is attached to open said enclosed case and chassis.

5. In an instrument, a combined case and chassis, including, a pair of identical substantially U-shaped channels having, on the inner walls thereof adjacent the upper ends of the legs of the U, interfitting means holding said channels together to form the sides of the combined case and chassis, means closing the ends of the combined case and chassis to form a hollow in the interior thereof, fasteners securing said means to the end of said channel, a board of insulating material mounted in said hollow, electric circuit components mounted on said board, and an electric switch electrically connected to at least one of said components, and means mechanically connecting one of said fasteners and said electric switch to actuate said electric switch when said fastening is actuated to open said combined case and chassis.

6. In an instrument, a combined case and chassis, including, a first U-shaped channel, a second U-shaped channel substantially identical with said first U-shaped channel, said U-shaped channels having, adjacent the upper ends of the legs of the U, means interfitting together to hold the channels in spaced relation to each other, flat plates closing the open ends of said channels to form a box-shaped combined case and chassis having a hollow in the interior thereof, a block of insulating material mounted on said combined case and chassis, input terminals mounted on said block, a board of insulating material mounted in openings in one of said channels in the interior of said combined case and chassis, contacts on said board adapted for engagement with said input terminals, circuit components mounted on said board, an electric switch mounted on said combined case and chassis and having connection with at least one of said circuit components, fastening means connecting said plates to the open ends of said channels, and switch-actuating means connected between at least one of said fastenings and said electric switch to actuate said electric switch when said fastening is operated to open said combined case and chassis.

7. An instrument including, a combined case and chassis having a pair of identical substantially U-shaped channels interfitting together at the open end of the U, means closing the open ends of the channel to form a case which completely surrounds its hollow interior, fastening means connecting said means closing the open ends of the channels to fasten said means closing the open ends of the channels to said channels, an electric switch mounted on the combined case and chassis, and a spring interposed between one of said fastening means and said electric switch to actuate said electric switch when said fastening means is actuated to open the combined case and chassis.

8. In an instrument, a combined case and chassis, including, a pair of identical substantially U-shaped channels having, on the inner walls thereof adjacent the upper ends of the legs of the U interfitting means holding said channels together to form the sides of the combined case and chassis, means closing the ends of the combined case and chassis to form a hollow in the interior thereof, fasteners securing said means to said channels, an electric switch mounted on the combined case and chassis, a switch actuating member pivotally mounted on the combined case and chassis, and having engagement with said electric switch and with one of said fastenings, so that when said fastening is actuated to open said case said electric switch is operated.

9. In a measuring and indicating instrument, a combined case and chassis adapted to be rapidly and economically mass produced including, a pair of identical, extruded, aluminum channels having a U-shaped cross-section and having their greatest dimension at right angles to said U-shaped cross-section, said channels each having at the end of one leg of the U a block having a longitudinally extending groove therein and each having at one end of the other leg of the U a tongue adapted to slide into and to interfit with the groove so that the two U-shaped channels form a combined case and chassis having a hollow interior, substantially flat front and rear plates adapted to overly the open ends of the U-shaped channels to form the end walls thereof, means for attachably and detachably securing said flat plates to said U-shaped channels, electrical input terminals of conducting material, an input terminal block of insulating material attached to said case and supporting said input terminals, a first terminal block of insulating material attached to said case, contacts mounted on said first terminal block and connected to the input terminals on said input terminal block, a board of insulating material, a plurality of circuit components mounted thereon and connections connecting said circuit components into an electric circuit, means for slideably mounting said board in said casing so that contacts on said board engage with contacts on said first terminal block, a second terminal block of insulating material attached to said case, a plurality of contacts mounted on said second terminal block, a second board of insulating material slideably mounted in said casing and having a number of components mounted thereon and means connecting said components together into an electric circuit, certain of the contacts on said second board engaging with certain of the contacts on said second terminal block, and means for cutting off the electricity when the combined case and chassis is opened, comprising, an electric switch mounted in said case, actuating means for said electric switch pivotly mounted in said case, a spring bearing on said actuating means and biasing it for movement in one direction, an elongated rod contacting said actuating means and said spring and adapted to actuate said actuating means against the bias of said spring, and means for attaching one of said plates to said U-shaped channels and actuating said rod so as to actuate said switch when said means for attaching said plate is operated to detach said plate.

10. In an instrument having a combined case and chassis, a substantially U-shaped channel of extruded aluminum having side walls and a base wall thicker than sheet metal, a block at one end of one side wall having a groove extending longitudinally thereof, a tongue at the end of the other side wall and adapted to slide into and to interfit with the groove in the block, the walls of the channel at the junctions of the side walls and the base wall being thicker than elsewhere and each having a screw-receiving opening of substantially circular transverse-cross-section and a board-receiving opening of substantially rectangular-cross-section therein.

References Cited in the file of this patent

UNITED STATES PATENTS

| | | |
|---|---|---|
| 1,061,646 | Welliver | May 13, 1913 |
| 1,066,215 | Murray | July 1, 1913 |
| 1,654,225 | Tanner | Dec. 27, 1927 |
| 2,363,364 | Rugg | Nov. 21, 1944 |
| 2,542,853 | Wills | Feb. 20, 1951 |
| 2,731,555 | Beck | Jan. 17, 1956 |
| 2,735,965 | Balanda | Feb. 21, 1956 |
| 2,798,781 | Anderson | July 9, 1957 |
| 2,800,380 | Baker | July 23, 1957 |
| 2,820,875 | Werych | Jan. 21, 1958 |
| 2,858,515 | Thunander | Oct. 28, 1958 |

FOREIGN PATENTS

| | | |
|---|---|---|
| 914,909 | France | Oct. 22, 1946 |
| 986,540 | France | Aug. 1, 1951 |